March 3, 1953 — R. W. DUNN — 2,630,376
MULTIPLE EXTRACTION APPARATUS
Filed Nov. 15, 1949

INVENTOR.
RAYBURN W. DUNN
BY Roland A. Anderson
ATTORNEY.

Patented Mar. 3, 1953

2,630,376

UNITED STATES PATENT OFFICE 2,630,376

MULTIPLE EXTRACTION APPARATUS

Rayburn W. Dunn, Berkeley, Calif., assignor to The Regents of the University of California, Berkeley, Calif.

Application November 15, 1949, Serial No. 127,290

4 Claims. (Cl. 23—267)

This invention relates to a new improved extraction apparatus especially adapted to the carrying out of processes wherein a plurality of stages of extraction is desired.

It is an object of the invention to provide an improved extraction apparatus comprising essentially a single stationary member mounted in nesting relation to a single rotatable member and forming a compact, efficient assembly in which a dual extraction process may be carried out.

A second object is to provide an improved baffling arrangement between stationary and rotating members of an extraction apparatus.

Another object is to provide an improved reservoir arrangement in extraction apparatus for containing bodies of solutions under treatment.

A further object is to provide an improved agitating and pumping means for circulating a solvent through an extraction apparatus.

Other objects and advantages of the invention will be evident from the following description when read in conjunction with the accompanying drawing in which Figure 1 is an assembly view partially shown in section and illustrating one form of apparatus containing liquids under treatment and with the hydrostatic levels thereof substantially corresponding to those obtaining during operation of the apparatus;

Figures 1, 2, 3:
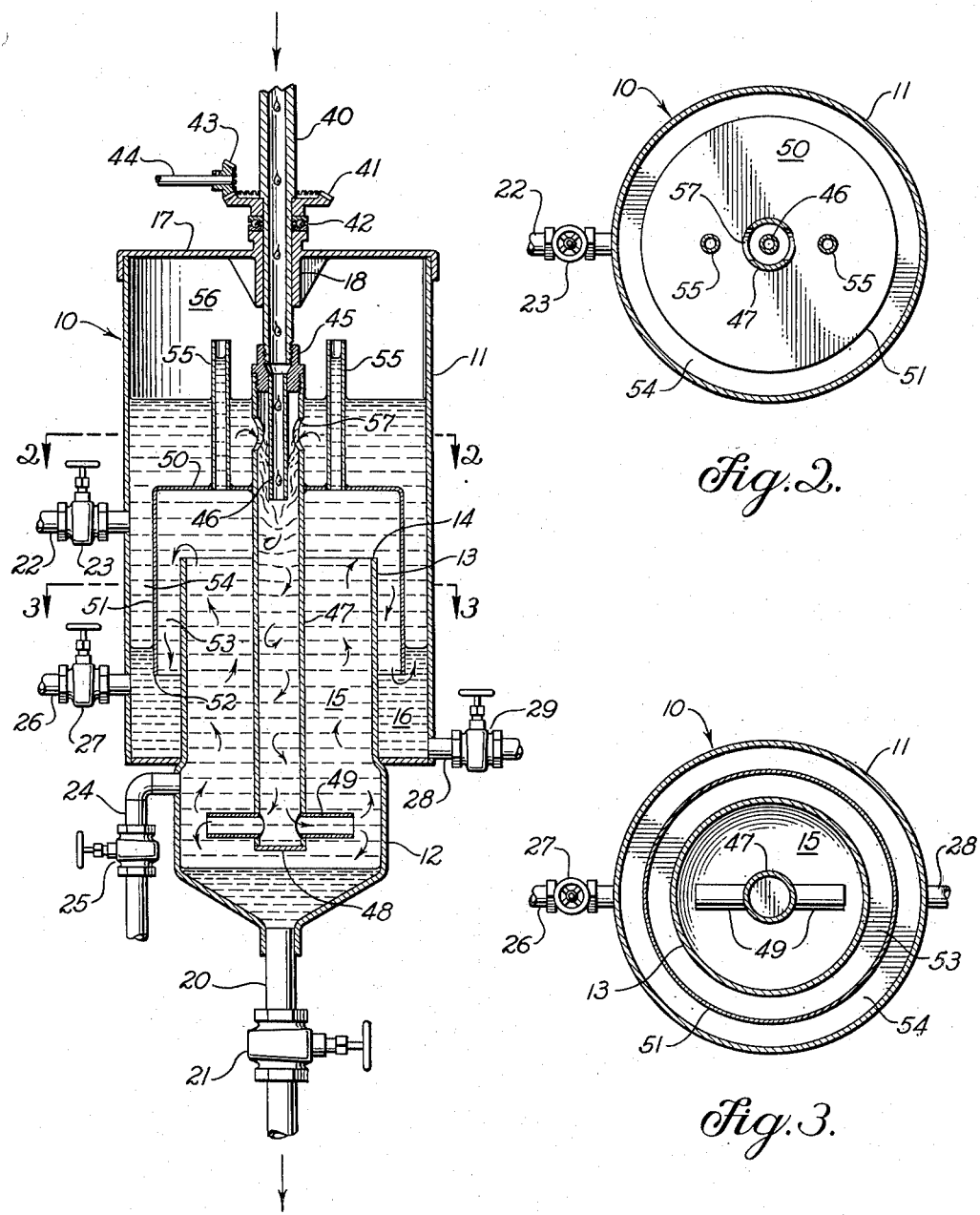
Fig. 2 is a sectional view taken along line 2—2 of Fig. 1.
Fig. 3 is a sectional view taken along line 3—3 of Fig. 1.

As is well known, many manufacturing processes make use of a solvent for extracting a desired material together with impurities from a first solution and then bring said material and impurities into contact with a second solution wherein the material may be selectively extracted while the impurities remain with the solvent. Such a process may efficiently and quickly be carried out in my improved apparatus without especial limitations as to the precise materials under treatment. For example, the apparatus may be used when it is desired to extract iron from a first aqueous solution containing ferric chloride and impurities by means of an ether solvent. In such case the ether containing the ferric chloride and impurities is contacted with a second aqueous solution, such as sodium hydroxide, which destroys the ferric chloride complex and permits a subsequent recovery of purified iron from the second solution. As another example, uranium may be extracted from a first solution containing an aqueous nitrate material with uranium and impurities present therein. The ether solvent containing the uranium and impurities is contacted with a second aqueous solution, such as a carbonate solution, which selectively extracts the uranium from the solvent and permits a subsequent recovery of purified uranium from the second solution. Accordingly, as used herein, the term "first solution" is intended to mean the solution in which the desired material is first introduced into the apparatus; the term "second solution" is intended to mean the solution into which the desired material is selectively isolated, and the term "solvent" is intended to mean the fluid which extracts the desired material from the "first solution" and from which the desired material is extracted by the "second solution."

Referring now to Fig. 1, a stationary tank 10 having a generally cylindrical external wall 11 and provided with a smaller diameter depending reservoir portion 12, hereinafter called the "second reservoir," is mounted upon any suitable base support, not shown. Within tank 10 a wall 13 terminating in an upper edge 14 is suitably mounted and serves to divide the interior of the tank into a space 15 and a space 16, the latter space being hereinafter called the "first reservoir." Wall 13 serves as a baffle member and preferably is concentrically located with respect to outer wall 11 and extends about midway of the longitudinal axis of the tank. At its top the tank may be provided with an unsealed, removable cover 17 having a centrally disposed apertured boss 18 adapted to receive a rotatable shaft later to be described.

Extending from the second reservoir 12 is any suitable drain conduit 20 controlled by valve 21 and adapted to drain the second solution and the extracted material from the tank. For the purpose of circulating solvent through the apparatus an inlet conduit 22 controlled by valve 23 and an outlet conduit 24 controlled by valve 25 may be provided at a convenient location. Moreover, for the purpose of circulating the first solution through the first reservoir an inlet conduit 26 controlled by valve 27 and an outlet conduit 28 controlled by valve 29 is provided.

As will be noted, the distance from the bottom of the first reservoir space 16 to the top of baffle 13 is less than the distance from the bottom of the second reservoir 12 to the top of that baffle. Due to the violent agitation which occurs in space 15 and the separatory action required of the nonmiscible mixture intended to be employed therein, sufficient distance is thus provided for the lighter portion of the mixture to separate out before being forced over the edge 14 of the baffle.

Cooperating with thus described simple and compact stationary portion of the extraction apparatus, in the novel manner later to be described, is an equally simple and compact rotatable portion.

A vertically disposed shaft 40, herein shown serving also as a conduit, may be provided at a suitable location with a ring gear 41 rigidly affixed thereto. This gear or any other appropriate collar on shaft 40 may bear against the top of boss 18 through a thrust bearing structure 42 and thus support the weight of the rotating portion of the extraction apparatus. A pinion gear 43 driven by shaft 44 serves to impart the desired rotation to the shaft 40 and its attached parts.

Shaft 40 may have attached thereto a hollow coupling 45 to which is also attached a hollow nipple 46 serving as an extension of hollow shaft 40. In addition, there may be attached to said coupling a hollow agitator tube 47 serving as support for the rotatable agitating and baffling structure of the extractor. Tube 47 preferably terminates in a closed lower end wall 48 adapted to extend well into the second reservoir space and adjacent this lower end it is provided with a plurality of radial hollow nozzles 49 serving to impel fluid outwardly from the interior of the rotating tube 47 and to serve as a mechanical agitator for the fluids contained in the second reservoir.

Adjacent its upper end, tube 47 has rigidly affixed thereto a roof member comprising a generally horizontal sheet portion 50 extending radially to a distance greater than the radial distance of stationary wall 13 and provided with a depending cylindrical skirt portion 51. The skirt portion, as will now be apparent, serves as a baffle whose lower end 52 extends into the first reservoir space 16 and whose wall serves to force any fluid passing from the second to the first reservoir to travel through narrow spaces 53 and 54 of predetermined size. Since the roof member thus provides an enclosure for the upper portion of space 15, which otherwise would entrap gaseous ingredients of the agitated liquids under treatment, a plurality of hollow tubes or vents 55 are attached to the sheet 50 and serve to vent into the upper space 56 of tank 10 any gas thus entrapped within the extraction apparatus. Such tubes are of a length sufficient to accommodate the liquid forced thereinto from below the roof member 50 and in effect constitute a barometric leg indicative of the relative pressure conditions existing within the apparatus while in operation.

At a suitable point above its attached sheet 50, the tube 47 is provided with one or more apertures 57 into which the solvent is drawn during rotation of the tube.

As will occur to those skilled in the art, heat exchange jackets may be adapted to the stationary tank parts or to the rotatable parts, or to both such elements, without departing from the invention. Moreover, rather than using straight baffles 13 and 51 these members may be provided with special means, such as scoops, projections, corrugations or the like to increase turbulence and contact of mixed fluids when a more gentle flow is not desired. Furthermore, the cover 17 may be sealed to wall 11 in order to provide a hermetic seal for tank 10 in case operation at atmospheric pressure is not desired.

Having thus described one form in which my invention may be embodied, the operation thereof will be evident from the following description in which the entry of the second solution into the apparatus is made through the upper portion of shaft 40. As will be noted, the operation may be conducted either as a batch or continuous extraction. With a suitable quantity of first solution in the first reservoir and a suitable initial quantity of second solution in the second reservoir, a suitable amount of solvent is then introduced through conduit 22 and rotation of shaft 40 and its associated apparatus is begun. Meanwhile, a suitable supplementary quantity of the second solution is introduced through shaft 40 and passes through nipple 46 into immediate mixture with a solvent. This mixture is thrown outwardly by nozzles 49, meanwhile mixing with the adjacent second solution in reservoir 12, and when an organic solvent, such as ether, and an aqueous solution, such as a suitable hydroxide, are thus mixed the resulting turbulent mixture is still nonmiscible. Since both the first and second solutions customarily have a greater specific gravity than the solvent, a separatory action takes place as the mixture moves upwardly through space 15. Rotation of the nozzles 49 serves to build up a pressure within space 15 since both baffles 13 and 51 are submerged. This pressure then builds up a hydrostatic head of solvent within vents 55 and also serves to force the lighter solvent over the edge 14 of wall 13 and downwardly through space 53 along the rotating baffle 51. Due to its pressure the solvent then passes under the edge 52 of the rotating baffle and in passing through the hydrostatic head of the first solution in the first reservoir 16, performs its first extraction phase. As the solvent carrying the material to be extracted, together with impurities, moves upwardly into space 56 it is pulled into apertures 57 of revolving tube 47 and again moves into the second reservoir 12. Here its nonmiscible admixture with the second solution permits the selective extraction of the desired material into such second solution which, due to its greater specific gravity, tends to move into the bottom of the second reservoir 12. Meanwhile the solvent with impurities, but substantially devoid of the desired material, moves again into contact with the first solution in the first reservoir. By this repeated circulation the dual extraction is continued until a suitable concentration of the second solution with extracted material is provided in the bottom of reservoir 12 at which time it may be drawn off through conduit 20. The solvent with its increased content of impurities likewise may be drawn off through conduit 24 whenever desired, makeup being meanwhile supplied through conduit 22.

Having thus described the invention, it will be apparent that other embodiments thereof may be devised by those skilled in the art and it is to be understood that the scope of the invention is considered to be limited only by the scope of the appended claims.

What is claimed is:

1. Plural stage extraction apparatus comprising a vertically extending cylindrical tank having a cover disposed across the upper end thereof, an inner cylindrical tank of reduced diameter projecting upwardly through a corresponding central opening in the bottom of said first tank, the open upper end of said inner tank terminating substantially above the bottom of said first tank while the bottom of said inner tank is disposed a substantial distance below the bottom of said first tank, and integral fluid agitating and fluid supplying means for said tanks including rotatable inlet tube means extending from an external supply vertically and centrally through said cover and terminating adjacent the bottom of said inner tank, a cylindrical baffle having a horizontally disposed and centrally apertured cover portion through which said tube integrally extends, the cylindrical wall portion of said baffle being disposed between said first tank and said inner tank and the lower margin thereof terminating below the upper end of said inner tank, and suitable ingress and exit connections to said tanks and tube.

2. Apparatus as described in claim 1 wherein the cover portion of said cylindrical baffle is provided with a plurality of vent tubes communicating with the space surrounded by said baffle and extending vertically for a substantial distance above said cover portion.

3. Apparatus as described in claim 1 wherein said tube is laterally apertured immediately above said cover portion and the latter is provided with a plurality of vent tubes communicating with the space surrounded by said baffle and extending vertically for a substantial distance above said cover portion.

4. Apparatus as described in claim 1 wherein said tube is provided with an inwardly spaced nipple of reduced diameter united thereto substantially above said cover portion and in closed conduit relation with the externally extending portion of said tube, and said tube is also apertured laterally above the lower end of said nipple.

RAYBURN W. DUNN.

REFERENCES CITED

The following references are of record in the file of this patent:

UNITED STATES PATENTS

| Number | Name | Date |
|---|---|---|
| 1,353,571 | Dreibrodt | Sept. 21, 1920 |
| 1,943,330 | Mitchell | Jan. 16, 1934 |
| 2,405,158 | Mensing | Aug. 6, 1946 |
| 2,458,261 | Green et al. | Jan. 4, 1949 |